US012620175B2

(12) United States Patent
Carlson et al.

(10) Patent No.: US 12,620,175 B2
(45) Date of Patent: May 5, 2026

(54) 3D MODELING PROCESS THROUGH CONVERSION OF LiDAR SCAN DATA

(71) Applicant: Trimble Inc., Westminster, CO (US)

(72) Inventors: Jon Carlson, Westminster, CO (US); Michael Tadros, Boulder, CO (US)

(73) Assignee: Trimble Inc., Westminster, CO (US)

( * ) Notice: Subject to any disclaimer, the term of this patent is extended or adjusted under 35 U.S.C. 154(b) by 281 days.

(21) Appl. No.: 18/136,807

(22) Filed: Apr. 19, 2023

(65) Prior Publication Data

US 2024/0355053 A1 Oct. 24, 2024

(51) Int. Cl.
*G06T 17/20* (2006.01)
*G01S 17/89* (2020.01)

(52) U.S. Cl.
CPC ............. *G06T 17/205* (2013.01); *G01S 17/89* (2013.01)

(58) Field of Classification Search
None
See application file for complete search history.

(56) References Cited

U.S. PATENT DOCUMENTS

| | | | |
|---|---|---|---|
| 2016/0055268 A1 | 2/2016 | Bell et al. | |
| 2019/0130637 A1* | 5/2019 | Parmar | G06T 7/70 |
| 2019/0340835 A1* | 11/2019 | Sinclair | G06T 19/20 |
| 2022/0375170 A1 | 11/2022 | Osokin et al. | |
| 2023/0044630 A1* | 2/2023 | Hill | G06V 10/764 |

OTHER PUBLICATIONS

Extended European Search Report for Application No. 24169688.9-1218, mailed Sep. 3, 2024, 7 pages.

* cited by examiner

*Primary Examiner* — Nurun Flora
(74) *Attorney, Agent, or Firm* — Kilpatrick Townsend & Stockton LLP

(57) ABSTRACT

A modeling system accesses a mesh model generated via a light detection and ranging (LiDAR) scan of an environment comprising a room, the mesh model including anchors corresponding to walls, a floor, and a ceiling of the room. The modeling system generates, based on the anchors in the mesh model, alternate walls for a modified mesh model, the alternate walls corresponding to mesh facets of the mesh model. The modeling system modifies a configuration of the mesh facets of the alternate walls to generate the modified mesh model. The modeling system renders a three-dimensional (3D) model of the environment from the modified mesh model.

20 Claims, 7 Drawing Sheets

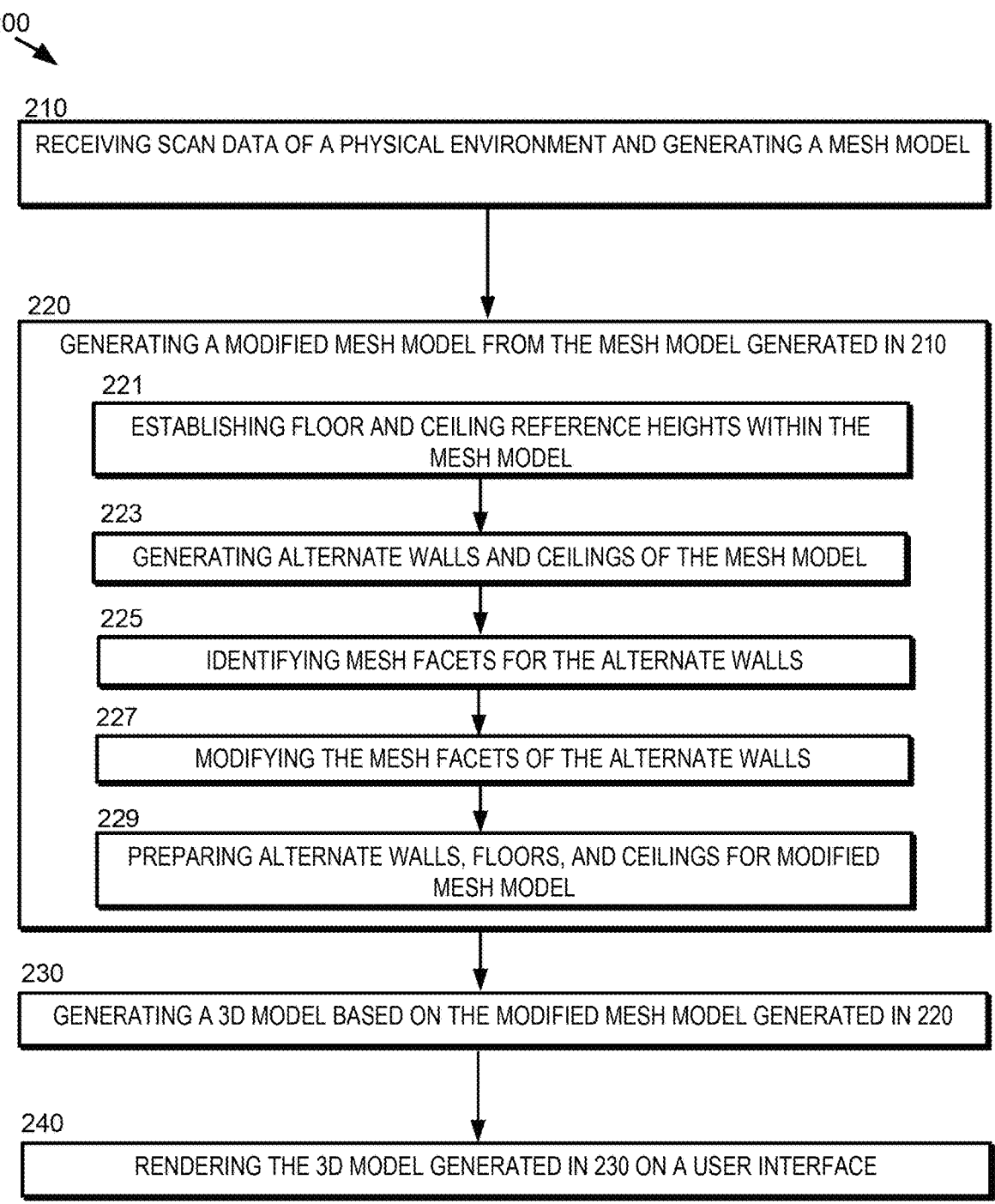

200

210
RECEIVING SCAN DATA OF A PHYSICAL ENVIRONMENT AND GENERATING A MESH MODEL

220
GENERATING A MODIFIED MESH MODEL FROM THE MESH MODEL GENERATED IN 210

221
ESTABLISHING FLOOR AND CEILING REFERENCE HEIGHTS WITHIN THE MESH MODEL

223
GENERATING ALTERNATE WALLS AND CEILINGS OF THE MESH MODEL

225
IDENTIFYING MESH FACETS FOR THE ALTERNATE WALLS

227
MODIFYING THE MESH FACETS OF THE ALTERNATE WALLS

229
PREPARING ALTERNATE WALLS, FLOORS, AND CEILINGS FOR MODIFIED MESH MODEL

230
GENERATING A 3D MODEL BASED ON THE MODIFIED MESH MODEL GENERATED IN 220

240
RENDERING THE 3D MODEL GENERATED IN 230 ON A USER INTERFACE

FIG. 2

300 (E.G. PROCESS FOR IMPLEMENTING BLOCK 223)

400 (E.G. PROCESS FOR IMPLEMENTING BLOCK 227)

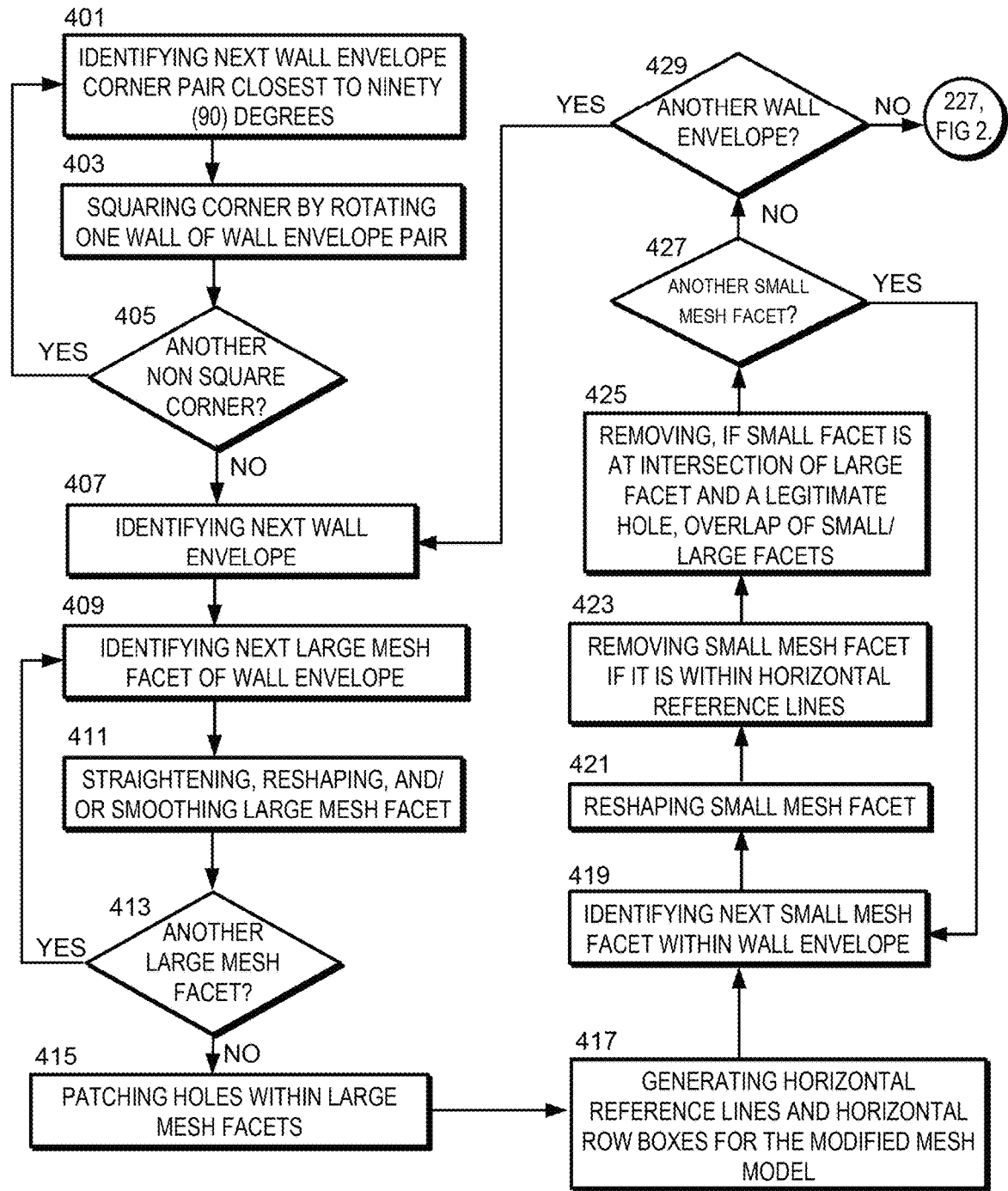

401
IDENTIFYING NEXT WALL ENVELOPE CORNER PAIR CLOSEST TO NINETY (90) DEGREES

403
SQUARING CORNER BY ROTATING ONE WALL OF WALL ENVELOPE PAIR

405
ANOTHER NON SQUARE CORNER?
YES
NO

407
IDENTIFYING NEXT WALL ENVELOPE

409
IDENTIFYING NEXT LARGE MESH FACET OF WALL ENVELOPE

411
STRAIGHTENING, RESHAPING, AND/ OR SMOOTHING LARGE MESH FACET

413
ANOTHER LARGE MESH FACET?
YES
NO

415
PATCHING HOLES WITHIN LARGE MESH FACETS

429
ANOTHER WALL ENVELOPE?
YES
NO
227, FIG 2.

427
ANOTHER SMALL MESH FACET?
NO
YES

425
REMOVING, IF SMALL FACET IS AT INTERSECTION OF LARGE FACET AND A LEGITIMATE HOLE, OVERLAP OF SMALL/ LARGE FACETS

423
REMOVING SMALL MESH FACET IF IT IS WITHIN HORIZONTAL REFERENCE LINES

421
RESHAPING SMALL MESH FACET

419
IDENTIFYING NEXT SMALL MESH FACET WITHIN WALL ENVELOPE

417
GENERATING HORIZONTAL REFERENCE LINES AND HORIZONTAL ROW BOXES FOR THE MODIFIED MESH MODEL

*FIG. 4*

3D MODELING PROCESS THROUGH CONVERSION OF LiDAR SCAN DATA

TECHNICAL FIELD

This disclosure generally relates to systems for generating virtual three-dimensional models. More specifically, but not by way of limitation, this disclosure relates to generating virtual three-dimensional models based on light detection and ranging (LiDAR) scanning.

BACKGROUND

Conventional modeling systems enable scanning a room or other environment using light detection and ranging (LiDAR) to generate point clouds and triangulated mesh models of the environment based on the scan data. However, sub-regions of the conventionally generated models are often misaligned, which results in surfaces that are not flat. Also, regions of the mesh at the edges of walls, a floor, and/or a ceiling in a room may not be aligned with parallel edges of another surface or at a right angle. Further, the generated mesh may lack particular features (e.g., the mesh is missing a 'hole' in a wall region). Due to these inaccuracies, direct conversion of environmental mesh models generated via conventional modeling systems to virtual three-dimensional (3D) models does not result in accurate, easily editable, virtual 3D models that can be used in applications suitable for architecture and interior design CAD workflows, which require rectified orthogonal planes. When converting an unedited conventionally generated mesh into a 3D model, the inaccuracies in the mesh are introduced into the 3D model, and the resulting 3D model requires extensive further editing by the user to be useful in architectural modeling and other applications. For example, the user may need to consolidate a single combined mesh representing the wall(s)/floor(s)/ceiling(s) mesh into separate objects that represent the wall(s), the floor(s), and the ceiling(s), realign wall(s)/floor(s)/ceiling(s) objects with respect to each other, and/or fill in holes (or cut out holes) in wall(s)/floor(s)/ceiling(s) objects in the 3D model. Such editing operations require extensive interaction with the user interface, which is inconvenient for users and which may not be feasible with certain user interfaces such as mobile device touchscreens due to the large amount of data generated by the raw mesh model that is imported.

SUMMARY

Certain embodiments involve a modeling system generating a 3D model of an environment from a mesh model, according to certain embodiments described in the present disclosure. A modeling system accesses a mesh model generated via a light detection and ranging (LiDAR) scan of an environment comprising a room, the mesh model including anchors corresponding to walls, a floor, and a ceiling of the room. The modeling system generates, based on the anchors in the mesh model, alternate walls for a modified mesh model, the alternate walls corresponding to mesh facets of the mesh model. The modeling system modifies a configuration of the mesh facets of the alternate walls to generate the modified mesh model. The modeling system renders a 3D model of the environment from the modified mesh model.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 2 depicts an example of a method for modifying a mesh model of an environment and converting the modified mesh model to a 3D model, according to certain embodiments described in the present disclosure.

FIG. 4 depicts an example of a method for modifying the alternate walls of a mesh model, according to certain embodiments described in the present disclosure.

DETAILED DESCRIPTION

Figure 1:
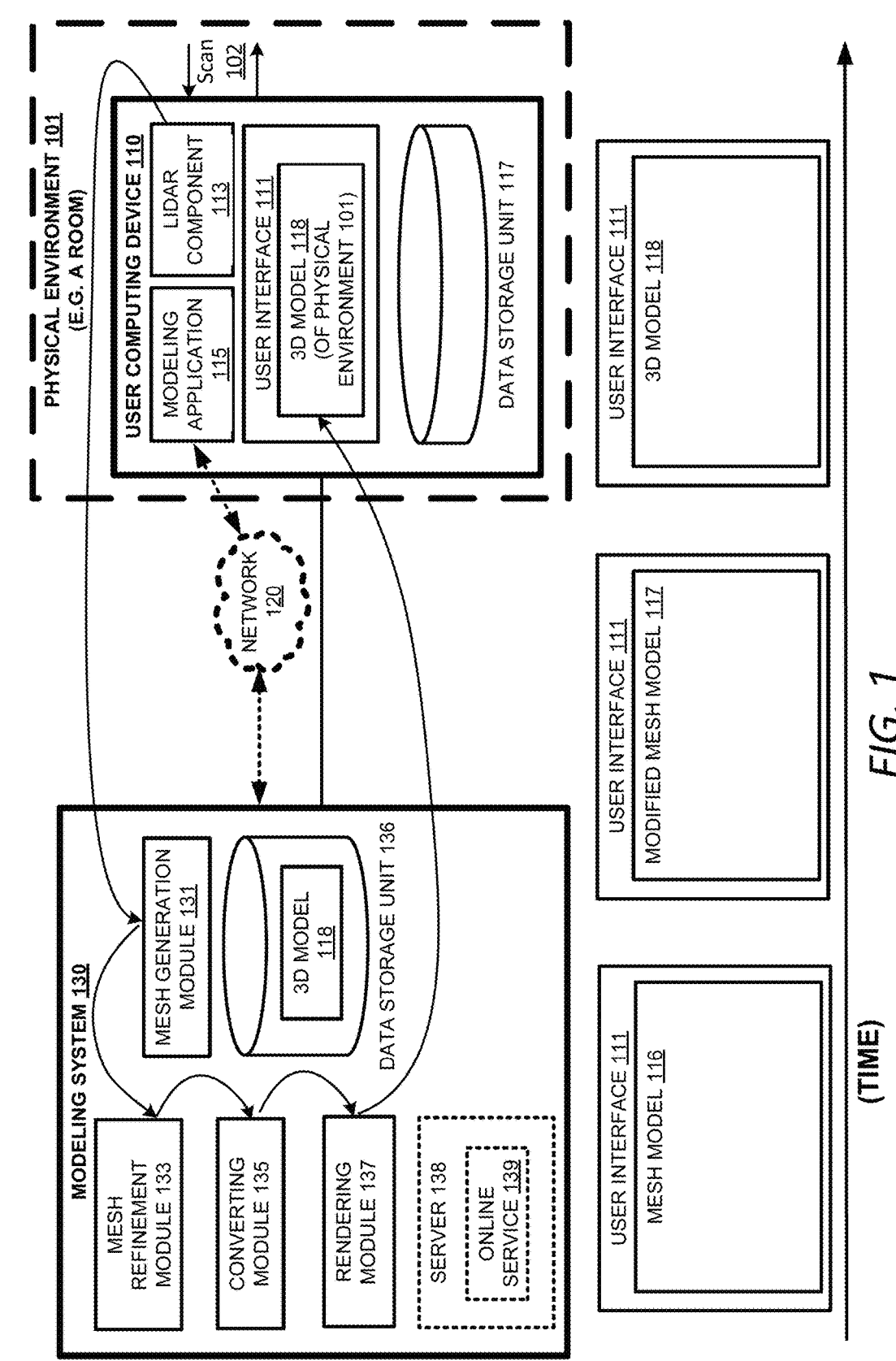
FIG. 1 depicts an example of a computing environment for modifying a mesh model of an environment and converting the modified mesh model to a 3D model, according to certain embodiments described in the present disclosure.

The present disclosure involves modifying a mesh model generated via a LiDAR scan of an environment and converting the modified mesh model to a 3D model. For instance, as explained above, conventional modeling systems generate mesh models of an environment which may include various inaccuracies, such as misaligned regions of mesh, missing regions of the mesh, and a duplication of regions of the mesh. Accordingly, conventional 3D models generated from meshes are not adequate for use in architectural and design applications (for example, the resulting 3D model does not have rectified orthogonal planes) and require extensive editing of the 3D model to bring it into condition for such architectural or design usage, thereby decreasing the ease of use for users for mobile device applications.

Certain embodiments described herein can avoid one or more of these problems by, for example, further modifying a mesh model before conversion of the mesh model to a 3D model. Modifying the mesh model includes identifying alternative wall/ceiling/floor regions (or other regions associated with objects such as windows, doors, furniture elements, and the like) of the mesh model, realigning regions of the mesh model, and closing any gaps in the mesh model to generate a modified mesh model that can be converted to a 3D model that requires substantially less (or, in some instances, none) user editing compared to 3D models generated using an unmodified, conventionally generated mesh model. Incorporating the process described herein for pre-processing of the mesh model before converting it to a 3D model increases a usability of the user interface by enabling a 3D model to be generated from a single scan without requiring extensive correction of the generated 3D model. This significant decrease in the amount of interaction necessary with the user interface to modify/correct the generated 3D model simplifies the user experience compared to the user experience in conventional modeling systems.

The following non-limiting example is provided to introduce certain embodiments.

A modeling application of a user computing device accesses scan data of an environment of the user device. The modeling application enables a user to create a virtual 3D space itself by scanning (via LiDAR or other scanning method) an environment of the user device and to add, remove, edit, or otherwise manipulate objects in the virtual 3D space. For example, the application may be a drawing application that enables a user to create virtual environments representing an environment of a user. The user may access the application via the user interface and create a new 3D virtual space or access a previously generated 3D virtual space. The scan data includes a position and travel time for each point of reflected light for each pulse of a 3D laser scan (e.g., a LiDAR scan). In some instances, a distance to a set of surface points in the environment is calculated based on the logged travel times and positional data. For example, the user interacts with the user interface of the user computing device to initiate a LiDAR scan and then scans a physical environment of the user. For example, the physical environment may be a room in which the user and the user computing device are located and the scan obtains scan data from the walls, the floor, and the ceiling of the room. In a certain example, the scan data includes a mesh model representing the scanned environment. In another example, the scan data includes a point cloud or other data representing the scanned environment.

The application establishes floor and ceiling reference heights within a mesh model obtained via a scan. The application generates alternate walls and ceilings of the mesh model. The application generates mesh facets for the alternate walls. The application modifies the mesh facets of the alternate walls. For example, modifying the mesh facets can include straightening, reshaping, or smoothing the mesh facets. Also, modifying the mesh facets can include filling holes in the mesh facets, and in some instances, cutting out holes (e.g., for windows or wall niches). The application prepares the modified alternate walls, floors, ceilings, and other objects for a modified mesh model. In some instances, the application displays the modified mesh model on a user interface. The application renders a 3D model based on the modified mesh model. In certain embodiments, the application modifies a point cloud model or other data obtained in the scan data instead of a mesh model and then renders a 3D model of the modified point cloud or the modified other data. The application displays the 3D model. In some instances, the user can select an object within the 3D model and modify one or more features (e.g., an orientation, a rotation, a color, a size, or other feature) of the object within the 3D model.

Certain embodiments provide improvements to computing systems by modifying a mesh model determined from an environmental scan to improve an accuracy of a 3D model generated from the mesh model. Applying the method to modify the mesh model can improve a functionality of a functionality of a user interface by requiring fewer (or even eliminating altogether) user interface inputs to generate a geometrically aligned and accurately labeled 3D model from scan data. For example, the methods described herein provide generation of a 3D model that requires little or no editing by a user. The methods herein only require the user to simply scan a physical environment using a user computing device and a 3D model with rectified orthogonal planes is automatically generated. For example, instead of a user having to provide one or more corrective inputs via the user interface to combine one or more wall objects into a single object (e.g., multiple parts of a wall into a single wall), align misaligned sections and corners of objects, or fill in missing portions of objects (e.g., fill in holes/missing regions in a wall), as required in conventional systems, the methods described herein enable a user to generate the 3D model directly from a scan of the environment without requiring substantial editing by the user to correct the 3D model.

As used herein, the terms "environment" or "physical environment" are used to refer to the physical surroundings of a user computing device. In embodiments described herein, a user can construct, using a modeling application of a user computing device, a 3D model of the environment by scanning the environment using a scanning module of the user computing device.

As used herein, the terms "environmental scan" or "scan" are used to refer to conducting a 3D laser scan of an environment of a user device. For example, the 3D laser scanning can comprise light distancing and ranging (LiDAR) scanning. For example, in LiDAR scanning, pulses of light are emitted from the user device and are reflected off surfaces (e.g., walls, ceiling, floor, other objects) of the environment back to the user device.

As used herein, the term "scan data" is used to refer to data logged by the user computing device based on the scan. For example, in LiDAR scanning, the user device may log, for each pulse, a position and travel time for each point of reflected light. In an example, the scan includes position and travel time data for reflected light. In some instances, a distance to a set of surface points in the environment is calculated based on the logged travel times.

As used herein, the terms "mesh model" and "mesh" are used to refer to a mesh that is generated to model the environment based on the scan data. In certain embodiments, the mesh is a triangulated mesh.

As used herein, the terms "modified mesh model" or "modified mesh" are used to refer to a mesh model that is modified using methods described herein (for example, in FIG. 2). In some instances, generating the modified mesh model includes realigning sections of the mesh, combining subsections of a region of the mesh, filling in missing portions of the mesh, and/or other modifications to the mesh model. The modified mesh model is converted to a virtual 3D model of the environment.

As used herein, the terms "virtual 3D model" or "3D model" are used to refer to a virtual 3D space including objects that represent the environment and, in some instances, objects within the environment. The 3D model is generated based on the modified mesh model. Objects can include wall objects, floor objects, ceiling objects, window objects, door objects, furniture objects, and/or other objects in the environment.

Example of an Operating Environment for
Modifying a Mesh Model of an Environment and
Converting the Modified Mesh Model to a 3D)
Model Referring now to the drawings, FIG. 1 depicts an example of a computing environment 100 for modifying a mesh model of an environment and converting the modified mesh model to a 3D model, according to certain embodiments described in the present disclosure. In some embodiments, the computing environment 100 includes a user computing device 110 and a modeling system 130.

In certain embodiments, as depicted in FIG. 1, the modeling system 130 is a component of the user computing device 110 and is not a separate system from the user computing device 110. In these embodiments, functions performed by the mesh generation module 131, the mesh refinement module 133, the converting module 135, the rendering module 137, and the data storage unit 136 are performed on the user computing device 110. In these embodiments, the user computing device 110 alone performs the steps illustrated in FIGS. 2-4 described herein without communicating with a modeling system 130 via the network 120.

In other embodiments, as also depicted in FIG. 1, the modeling system 130 is a separate system from the user computing device 110, and the modeling system 130 and the user computing device 110 communicate via a network 120. In these embodiments, the modeling system 130 includes a server 138, which supports an online service 139. In these embodiments, the user computing device 110 receives services from the modeling system 130. For instance, the modeling system 130 communicates data, stores data, processes one or more requests, or otherwise provides services to the user computing device 110. In these embodiments, the modeling system 130 performs one or more steps illustrated in FIGS. 2-4 and communicates with the user computing device 110 via a network 120.

In examples described herein, the user computing device 110 executes a modeling application 115 that enables the user to generate a 3D model 118 of a physical environment 101 of the user by scanning the physical environment 101 via a light detection and ranging (LiDAR) component 113 scan 102. The modeling application 115 can displays a 3D model 118 (e.g., three-dimensional virtual space) to a user via a user interface 111 of the user computing device 110 and allow the user to create, move, rotate, or otherwise edit one or more features of objects within the 3D model 118 by providing inputs via the user interface 111. In certain embodiments, one or more functions described as being performed by the modeling system 130 (e.g., one or more of the modules 131, 133, 135, or 137 thereof) are performed by the modeling application 115.

The user computing device 110 can include a user interface 111, a LiDAR component 113, a modeling application 115, and a data storage unit 117.

The modeling application 115 enables a user to generate a 3D model 118 of a physical environment 101 using a LiDAR component 113 to scan the physical environment 101. The 3D model 118 can include a virtual three-dimensional (3D) space, where the user can add and/or manipulate objects within the 3D space. For example, the modeling application 115 may be a drawing or modeling application that enables a user to create 3D models 118 including objects of nature, buildings, and other items generated by the user for various purposes such as designing buildings, scenes of nature, video game environments, or other appropriate purposes. The user may access the modeling application 115 via the user interface 111 and create a new 3D model 118 by conducting a scan 102 of the physical environment 101 via the LiDAR component 113 or access an existing 3D model 118 saved in a data storage unit 117 of the user computing device 110. The modeling application 115 can communicate scan 102 data from the LiDAR component 113 to the modeling system 130 and receive, from the modeling system 130, the 3D model 118 generated based on the scan 102 data.

The user may add objects to the virtual space and/or manipulate objects within the virtual space. The modeling application 115 stores a computer program code representation of the 3D model 118 along with any objects in the 3D model 118 and features associated with the objects (e.g., color, dimensions, position within the three-dimensional virtual space, orientation, etc.) in the data storage unit 117.

In certain embodiments, the modeling application 115 communicates with the modeling system 130 via the network 120. For example, the modeling application 115 may communicate with an online service 139 of the modeling system 130 via a server 138. In these embodiments, one or more functions described herein as being performed by the modeling application 115 may be performed by the modeling system 130 instead. In these embodiments, one or more functions described herein as performed by the modeling application 115 may instead be performed by a web browser application of the user computing device 110 that communicates with the modeling system 130 via the server 120.

An example light detection and ranging (LiDAR) component 113 is configured to scan a physical environment 101 of the user computing device 110 and log scan 102 data. The physical environment 101 could be a room of a building in which the user computing device 110 is located during the scan. Scan 102 data can include light intensity of reflected light received from locations in the physical environment 101. Although certain embodiments described herein use LiDAR, alternate types of scan data that indicate a distance from a scanning device to locations in the environment (e.g., sonar) could also be used.

The user interface 111 enables the user to provide input to the modeling application 115 and can output (e.g., via a display, sound, or other output) information to the user. The user interface 111 may comprise a touchscreen user interface, a VR user interface, a motion detection user interface, a user interface 111 that receives input based on user manipulation of a device (e.g., a computer mouse) that is communicatively coupled to the user interface 111, or other user interface 111 that can detect a contact or motion of the user. The user accesses the modeling application 115 and creates a new 3D model 118 or otherwise accesses a saved 3D model 118 by actuating one or more user interface objects on the user interface 111. The user interface 111 displays the 3D model 118 associated with the modeling application 115. The user may provide one or more gesture inputs to the user interface 111 using a finger, stylus, or other peripheral. In some instances, to create a new 3D model 118, the user selects, within the modeling application 115, an object on the user interface 111 that instructs the user computing device 110 to conduct a scan 102 of the physical environment 101. For example, the modeling application 115, responsive to receiving the user input via the user interface 111, instructs the LiDAR component 113 to conduct the scan 102. The LiDAR component 113 conducts the scan 102 of the physical environment 101, logs scan 102 data, and transmits the scan 102 data to the modeling application 115, which communicates the scan 102 data to the mesh generation module 131 of the modeling system 130.

As depicted in the lower section of FIG. 1, the user interface 111 can display a mesh model 116 generated by the mesh generation module 131 based on scan 102 data logged by the user computing device 110, which describes a physical environment 101 of the user computing device 110. At a time after displaying the mesh model 116, the user interface 111 displays a modified mesh model 117 generated by the mesh refinement module 133 from the mesh model 116. At a time after displaying the modified mesh model 117, the user interface 111 displays a 3D model 118 generated by the converting module 135 from the modified mesh model 117 and rendered for display via the user interface 111 via the rendering module 137. In certain embodiments, the user interface 111 displays the modified mesh model 117 as it evolves as modifications are made by the mesh refinement module 133. FIG. 2 at block 220 describes how the mesh model 116 is modified to generate the modified mesh model 117. In certain embodiments, after the mesh refinement module 133 completes its generation of the modified mesh model 117 (through modification of the mesh model 116) and the conversion module 135 converts the modified mesh model 117 to a 3D model 118, the user interface 111 displays the 3D model as rendered by the rendering module 137.

In some instances, the user interface 111 can receive one or more user inputs (e.g., gesture inputs, clicks, or other inputs) via the user interface 111 to instruct the modeling application 115 to add a virtual object to the generated 3D model 118. The user, in some instances, can use the modeling application 115 (or a separate web browser application on the user computing device 110) to view, download, upload, or otherwise access documents or web pages via a network 120. In certain embodiments, the modeling application 115 can interact with web servers or other computing devices connected to the network 120, including a server 138 of the modeling system 130.

The data storage unit 117 is accessible to the modeling application 115. The data storage unit 117 may store computer code representations of 3D models 118 generated by a user via a LiDAR component 113 scan 102 of the physical environment 101. In some examples, the data storage unit 117 stores scan 102 data detected by the LiDAR 113 component. In some examples, one or more functions described herein as performed by the data storage unit 117 may be performed by a data storage unit 136 of the modeling system 130. An example of a data storage unit 117 includes a local or remote data storage structure accessible to the user computing device 110 suitable for storing information. A data storage unit can store relevant data as one or more databases, one or more matrices, computer code, etc. In certain embodiments that include a modeling system 130 that is separate from the user computing device 110 and that communicates with the user computing device 110 via the network 120, the data storage unit 117 may be accessible to the modeling system 130 via the network 120.

The modeling system 130 executes one or more software modules that implement one or more online services. In this example, the modeling system 130 includes a mesh generation module 131, a mesh refinement module 133, a converting module 135, and a rendering module 137. The modeling system 130 also includes one or more data storage units 136. In certain embodiments, the modeling system 130 includes a server 138 and an online service 139 and communicates with the user computing device 110 via the network 120. However, in other embodiments, the modeling system 130 does not comprise the server 138 and the online service 139, and the modeling system 130 is a component of the user computing device 110 instead of a separate system that communicates with the user computing device 110 via the network 120.

In certain embodiments in which the modeling system 130 is a separate system from the user computing device 110, the server 138 provides content to the user computing device 110 accessed through the modeling application 115 (or through a separate web browser of the user computing device 110), including but not limited to html documents, images, style sheets, and scripts. In an example, the server 138 supports the online service 139. In some examples, the server 138 supports one or more of the mesh generation module 131, mesh refinement module 133, converting module 135, or rendering module 137.

In certain embodiments in which the modeling system 130 is a separate system from the user computing device 110, the online service 139 may be associated with the modeling application 115. In an example, a modeling application 115 resident on the user computing device 110 is associated with the modeling system 130 and communicates with the modeling system 130 to access the online service 139. In an example, the user accesses the online service 139 via the network 120 using a web browser of the user computing device 110 and downloads the modeling application 115 to the user computing device 110 via the network 120. The online service 139 may perform one or more functions described herein as being performed by the modeling application 115 and/or the web browser application of the user computing device 110. The online service 139 may perform one or more functions described herein as being performed by the modules 131, 133, 135, and/or 137. In some embodiments, the online service 139 comprises the modules 131, 133, 135, and 137.

The data storage unit 136 can store computer code representations of 3D models 118 generated by a user via a LiDAR component 113 scan 102 of a physical environment 101. An example of a data storage unit 136 includes a local or remote data storage structure accessible to the modeling system 130 suitable for storing information. The data storage unit 136 can store relevant data as one or more databases, one or more matrices, computer code, etc. In some examples, one or more functions described herein as performed by the data storage unit 136 may be performed by a data storage unit 117 of the user computing device 110.

The mesh generation module 131 generates a mesh model 116 based on a scan 102 conducted via a LiDAR component 113 of the user computing device 110. For examples, the mesh generation module 131 performs one or more operations described in block 210 of FIG. 2.

The mesh refinement module 133 generates a refined mesh model 117 from the mesh model 116. For example, the mesh refinement module 133 performs one or more operations described in block 220 of FIG. 2 and/or in blocks 221, 223, 225, 227, and 229 of FIG. 2 which describe a method for implementing block 220.

The converting module 135 converts the modified mesh model 117 to a 3D model 118. In certain embodiments, the converting module 135 can also convert the 3D model back to the modified mesh model 117. In certain embodiments, the converting module 135 can convert the mesh model 116 to a 3D model 118 as well as convert the mesh model 116 to a 3D model 118 as one or more editing operations (e.g., described in block 220) are applied to the mesh model 116 to generate the modified mesh model 117.

The rendering module 137 displays the 3D model 118 generated by the converting module 135 via the user interface 111 of the user computing device 110. In some embodiments, the rendering module 137 can also display the mesh model 116 and various stages of modification made to the mesh model 116 (e.g., modifications made via the operations of block 220 of FIG. 2) via the user interface 111. Displaying the mesh model 116, modified mesh model 117, or 3D model 118 can include instructing the user computing device to display the respective model 116/117/118 via the user interface 111.

In certain embodiments in which the modeling system 130 is a separate system from the user computing device 110, one or more of the user computing devices 110 and the modeling system 130 could include a device having a communication module capable of transmitting and receiving data over a data network 120. For instance, one or more of the user computing devices 110 and the modeling system 130 could include a server, a desktop computer, a laptop computer, a tablet computer, a television with one or more processors embedded therein and/or coupled thereto, a smart phone, a handheld computer, or any other wired or wireless, processor-driven device. For example, the modeling system 130 could include the server 138 and the user computing device 110 could include the modeling application 115 and/or a web browser.

In certain embodiments in which the modeling system 130 is a separate system from the user computing device 110, the data network 120 can include, but is not limited to, internet, local area network ("LAN"), wireless area network, wired area network, wide area network, and the like. For example, the data network 120 includes a wired or wireless telecommunication means by which network systems can communicate and exchange data. For example, each data network 120 can be implemented as, or may be a part of, a storage area network ("SAN"), a personal area network ("PAN"), a metropolitan area network ("MAN"), a LAN, a wide area network ("WAN"), a wireless LAN ("WLAN"), a virtual private network ("VPN"), an intranet, an Internet, a mobile telephone network, a card network, a Bluetooth network, a Bluetooth low energy ("BLE") network, a Wi-Fi network, a near field communication ("NFC") network, any form of standardized radio frequency, or any combination thereof, or any other appropriate architecture or system that facilitates communication of signals, data, and/or messages (generally referred to as data). It should be understood that the terms "data" and "information" are used interchangeably herein to refer to text, images, audio, video, or any other form of information that can exist in a computer-based environment.

Examples of Operations for Interpreting a User Interface Input for a Three-Dimensional Virtual Space from a User Touchscreen Gesture FIG. 2 depicts an example of a method 200 for interpreting a user interface 113 input for a three-dimensional virtual space from a user 101 touchscreen gesture, according to certain embodiments. For illustrative purposes, the method 200 is described with reference to the components illustrated in FIG. 1, though other implementations are possible. For example, the program code for the modeling application 115, which may be stored in a non-transitory computer-readable medium, is executed by one or more processing devices to cause the user computing device 110 to perform one or more operations described herein. For example, the program code for one or more of the online services 139 and/or the modules 133, 135, 137, and/or 139 of the modeling system 130 described herein, which may be stored in a non-transitory computer-readable medium, is executed by one or more processing devices to cause the modeling system 130 to perform one or more operations described herein.

At block 210, the method 200 involves receiving scan 102 data of a physical environment 101 and generating a mesh model 116. In certain embodiments, the mesh generation module 131 performs the functions described in block 210. In certain examples, prior to the user computing device 110 conducting the scan 102 and prior to receiving the scan 102 data, the mesh generation module 131 creates a dictionary including a set of anchor types that may be encountered during scanning keyed to a universal unique identifier (UUID) associated with each anchor type. For example, one dictionary is used for horizontal and vertical 'plane' anchor and a single dictionary for mesh faces. For example, horizontal and vertical plane anchor types may include floor, ceiling, wall, table, seat, door, window, or other anchor types. A mesh face anchor dictionary can be used to classify faces of a generated mesh model 116. In certain examples, the classification of each face is used to separate faces into further lists. While conducting a scan 102 of the physical environment 101 of the user computing device 110, the mesh generation module 131 adds an invisible floor plane (e.g., a "floor plate") including a reference point (e.g., a "spike") at its center which is used to reference the center/origin/user location at the beginning of the scan 102 and to observe rotation. Using the reference point allows the floor plane to update no matter which way the user computing device 110 is pointing during the scan 102 and ensures that all anchors continue to update. During the scan 102 of the physical environment 101, the mesh generation module 131 adds each anchor type in the anchor type dictionary to its own specific type of dictionary, and also updates its unique dictionary using its UUID. During the scan 102, the mesh generation module 131 adds window, door, and vertical 'other' type anchors to a wall dictionary in addition to their own unique dictionaries, and the converter looks for anchors that apply to multiple types (e.g., a "door wall," a "window wall," etc.). Based on the scan 102 data, the mesh generation module 131 generates the mesh model 116 including the anchors assigned to regions of the mesh model 116. An example anchor defines a position in the mesh.

At block 220, the method 200 involves generating a modified mesh model 117 from the mesh model 116 generated in block 210. In certain embodiments, the mesh refinement module 133 performs functions described in block 220. In certain embodiments, implementing block 220 involves implementing one or more of blocks 221, 223, 225, and 227. For example, the mesh refinement module 133 can perform one or more of identifying alternate ceiling and wall regions of the mesh model and storing envelopes associated with respective mesh facets (see block 221), realigning wall and ceiling mesh facets (see block 223), closing gaps in mesh facets (see block 225), or generating tags for ceiling and wall envelopes (see block 227).

At block 221, the method for implementing block 220 involves establishing floor and ceiling reference heights within the mesh model 116. The mesh refinement module 133, from the assigned floor type anchors in the mesh model 116, identifies a floor having a greatest area based on extents (e.g., dimensions) of the floor anchors. The mesh refinement module 133 determines a center vertical height of the identified largest floor anchor as a base reference ('z', height 0'0") for floor level. The mesh refinement module 133 determines, for each floor anchor, a floor height adjusted to the base reference 'z' level and rounded to a nearest predefined height difference (e.g., 2 inches or other predefined difference). Rounding the floor heights to the nearest predefined height difference ensures that small differences in height do not result in new floors in the modified mesh model 117. The mesh refinement module 133 creates a list of adjusted floor heights for the floor anchors. Likewise, the mesh refinement module 133 determines, for each ceiling type anchor, a height adjusted to the base reference 'z' level, and rounded to a nearest height difference (e.g., one half inch or other predefined difference). Rounding the ceiling heights to the nearest predefined height difference ensures that small differences in ceiling height do not result in new ceilings in the modified mesh model 117. The mesh refinement module 133 creates a list of adjusted ceiling heights for the ceiling anchors. In some embodiments, the mesh refinement module 133 organizes the ceiling anchors so that none are within a predefined height difference (e.g., two inches or other predefined distance) of each other, which removes small differences between ceilings.

At block 223, the method for implementing block 220 involves generating alternate walls and ceilings for the mesh model. In certain embodiments, the mesh refinement module 133 generates polygons corresponding to alternate walls based on dimensions associated with wall anchors. The mesh refinement module 133 rotates and/or repositions the alternate walls to align with the floor/ceiling. The mesh refinement module 133 also, in some instances, removes walls that were duplicated during the scan 102. The mesh refinement module 133 also creates a list of corners at alternate wall intersections and creates top/bottom corner guides for adding points to alternate ceilings/floors. The mesh refinement module 133 adds doors, windows, cabinets, and other objects that intersect with other walls to their own respective alternate door-walls, window-walls, cabinet-walls, and other-walls groups. Further, the mesh refinement module 133 creates a group that combines all of the lists/groups of walls generated at block 223.

Figure 3:
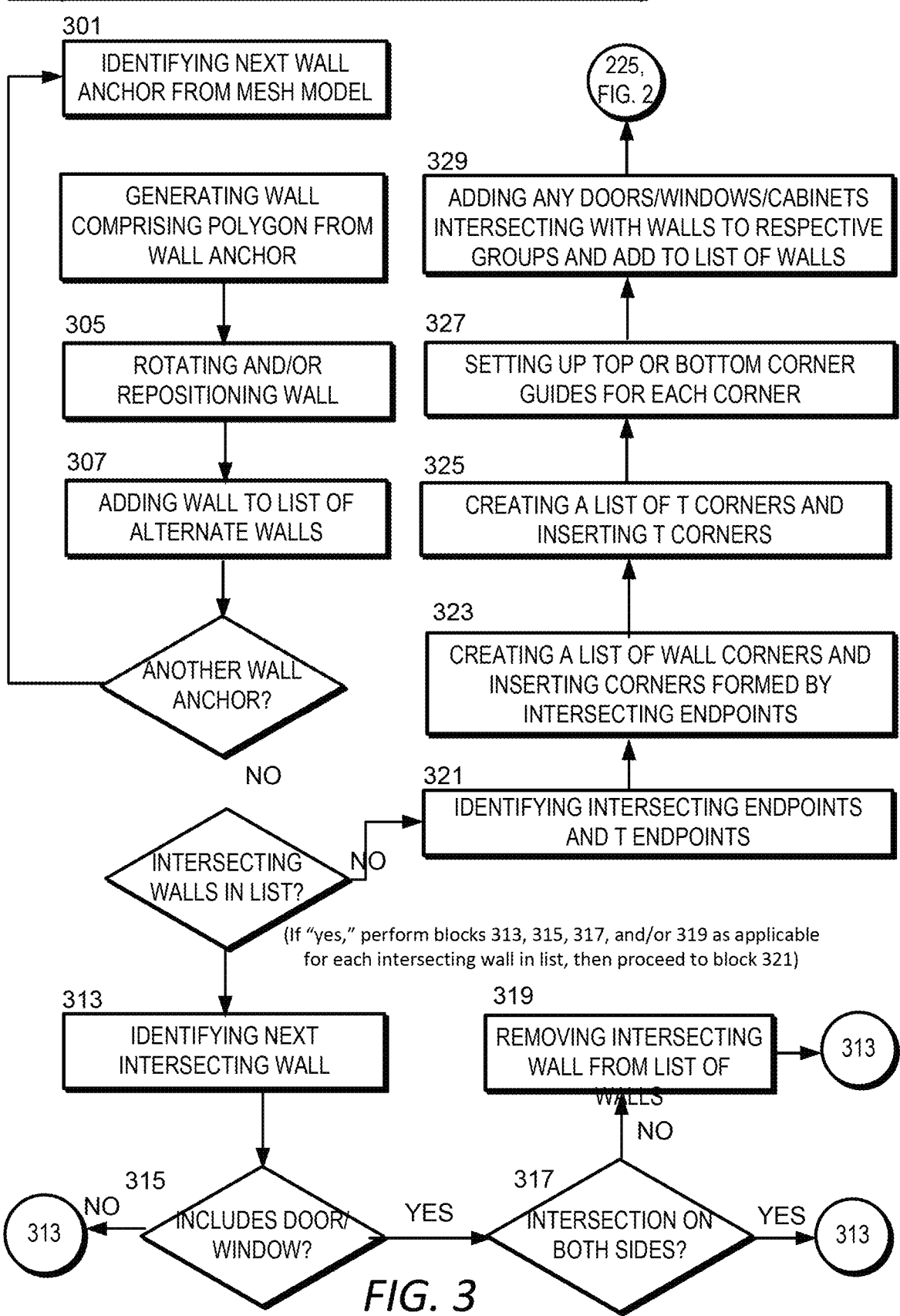
FIG. 3 depicts an example of a method for generating alternate walls and ceilings of the mesh model, according to certain embodiments described in the present disclosure.

Further details for implementing block 223 are described herein in FIG. 3.

At block 225, the method for implementing block 220 involves identifying mesh facets for the alternate walls. In certain embodiments, for each anchor in the mesh model 116, the mesh refinement module 133 creates a main vertex list including vertexes from offsets and strides of the mesh data. The mesh refinement module 133 also creates vertices for floor, wall, and ceiling groups. For the face index (identifying faces of the mesh model 116), the mesh refinement module 133 classifies each face of the mesh model 116 into a type. For example, the types include floor, ceiling, wall, table, seat, door, window, and other. Other types may be used instead of or in addition to these example types. For each face in the list of wall, ceiling, and floors (i.e. a planar list), the mesh refinement module 133 module (1) for a floor face, adds a vertex to a small wall mesh list if a normal is not correct (pointing up), (2) for a ceiling face, adds a vertex to the small wall mesh list if a normal is not correct (pointing down), (3) for a wall face, creates both a large facet mesh list/folder and a small facet mesh list/folder and adds a vertex to these lists. In some examples, the wall face is added to the large facet mesh list if the wall face is greater than a predetermined size (e.g., 0.2 meters or other predetermined size). Further, the mesh refinement module 133 adds door faces and window faces to the small wall mesh list. For each door/window/table/seat/other anchor types, the mesh refinement module 133 builds a list of indices from these anchors to be converted directly into a triangulated face mesh.

For each alternate wall face, the mesh refinement module 133 generates a plane equation from the normal of the wall and a position of the face. The mesh refinement module 133 transforms the equation into an integer which can be used as a key to find which mesh facets match the new alternate walls. Integers/keys are used in filling folders (e.g., envelopes) within each wall for facets in the large facet list and the small facet list. The mesh refinement module 133 generates a key for each mesh facet in the list of large mesh facets and places the mesh facet into a 'large mesh' folder within its 'parent' keyed wall folder/envelope. For each mesh facet in the list of small mesh facets, the mesh refinement module 133 places the mesh facet into respective parent wall folders/envelopes based on how close the facet is to a wall face. For example, if a mesh facet is within a predefined distance (e.g., 2.5 inches or other predefined distance) of two wall faces, the facet is created twice and placed into both wall envelopes/folders (corresponding to the two wall faces), and this mesh facet is 'projected' onto the wall face so that it becomes two dimensional (2D) with respect to the wall face. For mesh facets in the list of small door mesh facets or in the list of small window mesh facets, the mesh refinement module 133 places the mesh facet into respective parent wall folders/envelopes based on how close the facet is to a wall face.

At block 227, the method for implementing block 220 involves modifying the alternate walls of the mesh model generated in block 223. In certain embodiments, the mesh refinement module 133 transforms (e.g., rotates and positions) the alternate walls folders/envelopes to form corners that are right angles (ninety degrees) so that the corners are realistic. Rotating and positioning the walls may be important because, during the scan 102, the mesh model 116 often includes walls that are at slightly offset angles in the plane and/or tilted from vertical. In some embodiments, for each wall envelope, the mesh refinement module 133 straightens, reshapes, smooths, and/or patches holes in mesh facets of the 'large mesh facet' folder of wall envelope. In these embodiments, the mesh refinement module 133 generates horizontal reference lines for the modified mesh model 117 and then (1) reshapes mesh facets within the 'small mesh facet' folder of the wall envelope so that they correspond to the wall faces, (2) removes small mesh facets beyond the horizontal reference lines, and (3) removes overlaps between large and small mesh facets at the intersections of large mesh facets and holes.

Further details for implementing block 227 are described herein in FIG. 4.

At block 229, the method for implementing block 220 involves preparing alternate walls, floors, and ceilings for the modified mesh model 118.

In certain embodiments, for each of the alternate walls, the mesh refinement module 133 extracts a corresponding wall mesh envelope/folder to a wall-specific list, based on the classification of the wall as either a wall, door, window, or cabinet. If the folder/envelope is empty, the folder/envelope is added to a list of alternate walls (e.g., individual rectangular polygons) rather than mesh walls.

In certain embodiments, for the alternate ceilings and floors, the mesh refinement module 133 finds, for each ceiling anchor, a closest ceiling height to the ceiling anchor's center point and, for each floor anchor, a closest floor height to the floor anchor's center point. Based on the determined closest floor/ceiling height for the respective floor/ceiling anchors, the mesh refinement module 133 creates a key and finds top/bottom wall guides and corner guides using this key. For example, the mesh refinement module 133 finds a wall top/bottom guide group of points that corresponds to the key and a wall top/bottom guide group of corners that corresponds to the key. The mesh refinement module 133 groups each anchor's boundary vertices around the top/bottom guide group of points, so that the vertex (e.g., x, y) is snapped to the closest guide point, creating a ceiling shape that is now the same shape as the wall top/bottom guide points. In some instances, because more than one ceiling point could be assigned to the top/bottom guide points, the mesh refinement module 133 removes duplicates, keeping the ceiling points in order. Using the guide corners, the mesh refinement module 133 inserts points that create a corner into the current ceiling/floor shape and inserted into position in the list of points. In some instances, if a corner point is already part of ceiling/floor vertices, the mesh refinement module 133 removes the corner from the corner guide group list. After all corner points are considered, if additional corners in the guide group remain, the mesh refinement module 133 finds individual legs of the corner, matches the legs of the corner to the current floor/ceiling shape, and determines additional spots to add in a corner point into the current floor/ceiling shape. In some instances, the mesh refinement module 133 identifies and removes straggler ceiling/floor points remaining in the overall ceiling/floor shape.

In certain embodiments, the mesh refinement module 133 identifies wall envelopes that do not have a large face mesh folder and adds the facets associated with these wall envelopes to a list of individual wall mesh groups. Further, the mesh refinement module 133 adds the corresponding small facet mesh lists into these wall mesh groups. The full shape of a wall is created based on the large facet and small facet mesh. In certain embodiments, the mesh refinement module 133 creates individual tags for different levels of ceilings and/or floors. For example, the mesh refinement module 133 separates out each ceiling facet mesh list (a 'level') to its own group to create individual tags for each ceiling level. Similarly, the mesh refinement module 133 separates out each floor facet mesh list (a 'level') to its own group to create individual tags for each floor level.

After completing block 229, the method for implementing block 220 ends, and the method 220 proceeds to block 230.

Figure 5:
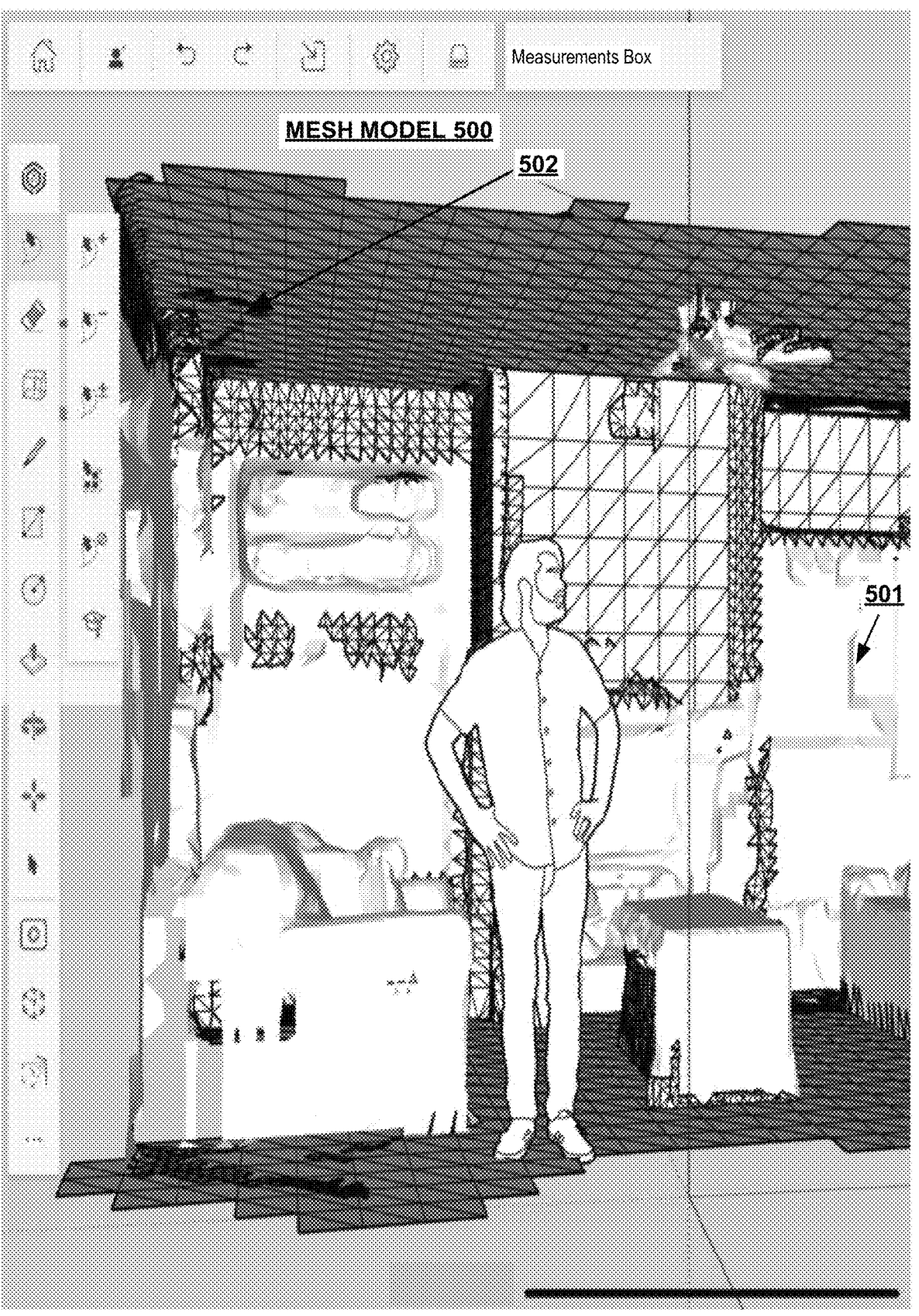
FIG. 5 depicts an example illustration of a mesh model, according to certain embodiments described in the present disclosure.
Figure 6:
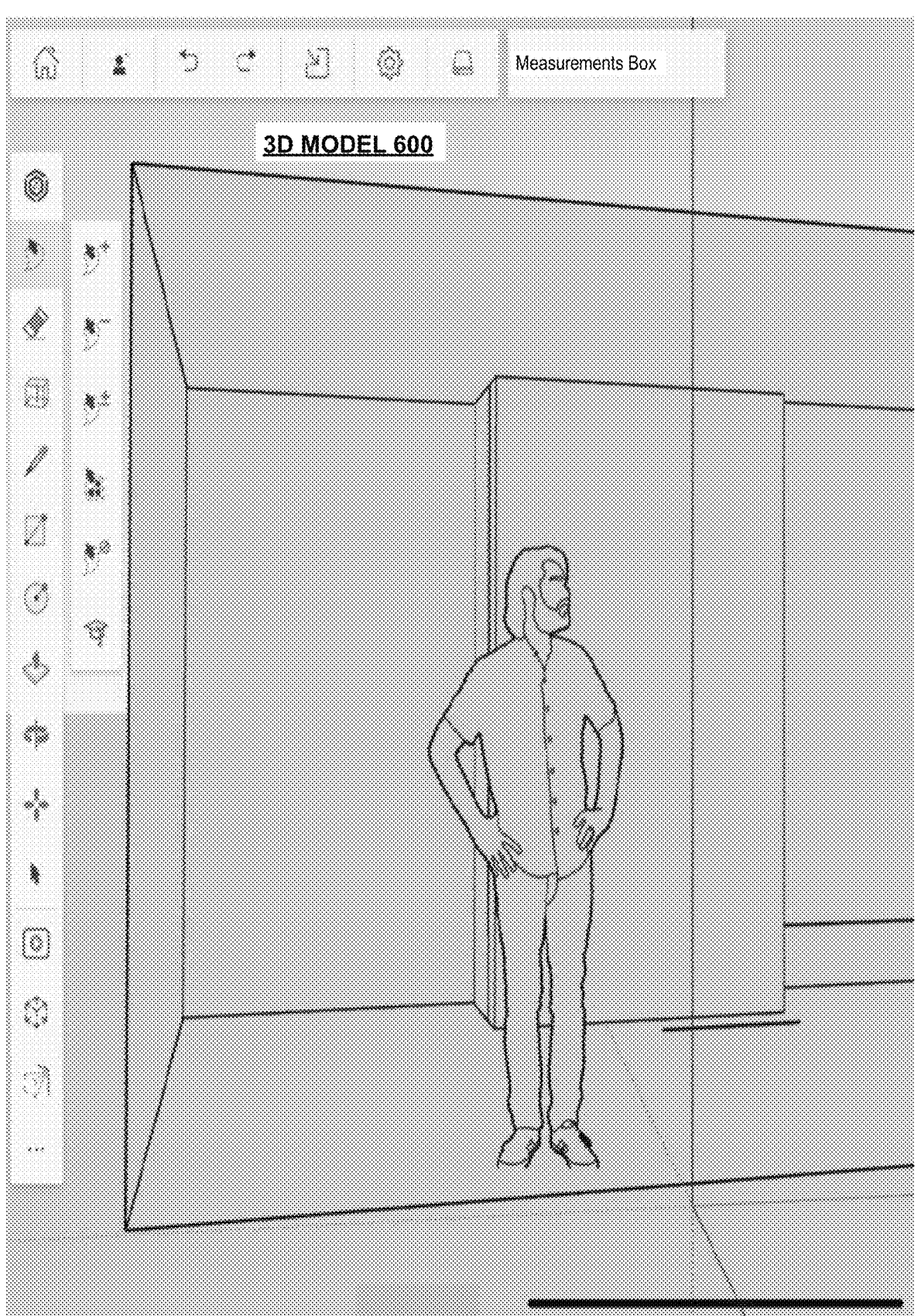
FIG. 6 depicts an example illustration of a 3D model 600 generated from the mesh model of FIG. 5 modified according to one or more of the methods described in FIGS. 2-4, according to certain embodiments described herein.

In certain embodiments, as also illustrated in the user interface 111 timeline section at the bottom of FIG. 1, the modeling system 130 displays, via the user interface 111 of the user computing device, the mesh model 116 and also the modifications made to the mesh model 116 to generate the modified mesh model 117 described in sub-blocks 221, 223, 225, and 227 as they are performed over time. FIG. 5 and FIG. 6 provide example illustrations of a mesh model 116 and of a 3D model 118, respectively.

From block 220, the method 200 proceeds to block 230.

At block 230, the method 200 involves generating a 3D model 118 based on the modified mesh model 116 generated in block 220. In certain embodiments the converting module 135 performs one or more operations described herein in block 230. In certain embodiments, the converting module 135 converts the modified mesh model 117 to one or more model data type functions (e.g., slapi functions or other model data type functions) that are used to generate a 3D model 118. For example, different modeling applications 115 or corresponding online services 139 may utilize specific model data type functions to render regions or other aspects of 3D models 118. In some instances, the converting module 135 generates model data type functions representing mesh arrays of planes, for example, for walls, ceiling, and floor. For example, the converting module 135 converts wall mesh groups (corresponding to each alternate wall envelope) to a model data type function, the floor mesh group to a model data type function, and the ceiling mesh group to a model data type function. In some instances, the converting module 135 generates model data type functions representing regular mesh groups, for example, for door faces, for window faces, for table faces, for seat faces, or for other faces of the modified mesh model 117. In some instances, the converting module 135 generates model data type functions representing alternate vertical plane groups, for example, alternate cabinets, alternate door-walls, alternate window-walls, and the alternate wall 'gathered' group (e.g., described later in block 329). In some instances, the converting module 135 generates model data type functions representing alternate planes per instance of each plane, for example, an alternate wall, an alternate ceiling, or an alternate floor with its own tag. In some instances, the converting module 135 merges any coplanar faces of wall mesh facets into a single polygon.

At block 240, the method 200 involves rendering the 3D model 118 generated in block 230 on a user interface 111. In certain embodiments, the 3D model 118 is rendered based on the model data type functions determined in block 230, which represent specific aspects of the modified mesh model 118. For example, the rendering module 137 displays the 3D model 118 via the user interface 111. For example, the rendering module 137 communicates the 3D model 118 to the user computing device 110 and instructions to display the 3D model 118 via the user interface 111. In certain examples, the user computing device 110 (e.g., the modeling application 115) stores the 3D model 118 in the data storage unit 117. In certain examples, the user adds, within the virtual space of the 3D model 118, a geometric object (e.g., a cylinder, a cube, a sphere, a pyramid), a pre-configured object design stored on the user computing device 110 and relevant to a context of the 3D model 118 (e.g., a door, a window, a tree, a table), or a pre-configured object design that the application 115 may look up by communicating with a remote server 138. In certain examples, the user selects an object in the 3D model 118 and resizes, repositions, rotates, changes one or more features (e.g., color, texture, material, etc.), deletes, duplicates, replaces, or otherwise edits the selected object within the 3D model 118.

FIG. 3 depicts an example of a method 300 for generating alternate walls and ceilings of the mesh model, according to certain embodiments. In certain embodiments, the method 300 is a method for implementing block 223 of FIG. 2. For illustrative purposes, the method 300 is described with reference to the components illustrated in FIG. 1, though other implementations are possible. For example, the program code for one or more of the online services 139 and/or the mesh refinement module 133 of the modeling system 130, which may be stored in a non-transitory computer-readable medium, is executed by one or more processing devices to cause the modeling system 130 to perform one or more operations described herein. Although the steps of method 300 are described herein as performed by the mesh refinement module 133, in certain embodiments one or more steps of method 300 are performed by the modeling application 115. For example, the program code for the modeling application 115, which may be stored in a non-transitory computer-readable medium, is executed by one or more processing devices to cause the user computing device 110 to perform one or more operations described herein.

At block 301, the method 300 involves identifying, by the mesh refinement module 133, a next wall anchor in the mesh model. For example, the mesh model 116 includes multiple wall type anchors identified in block 210. Wall anchors, in some embodiments, in addition to walls, can include windows/doors/cabinets which are part of the respective wall.

At block 303, the method 300 involves generating, by the mesh refinement module 133, a wall comprising a polygon based on the wall anchor. For example, the mesh refinement module 133 creates a four-point polygon to represent the wall based on the extent of the wall anchor. In some instances, the 'z' extent of the anchor represents the height, and the 'x' extent represents the width.

At block 305, the method 300 involves rotating and/or repositioning the wall by the mesh refinement module 133. The mesh refinement module 133 rotates and places the polygon points into a correct position, using a transformation matrix associated with the wall anchor. The mesh refinement module 133, in some instances, constructs a normal line and rotates and places the normal line into the correct position. The mesh refinement module 133 also compares the wall to ceiling heights of the ceiling type anchors and floor heights of the floor type anchors to find a closest ceiling anchor and a closest floor anchor for the wall. In some instances, the mesh refinement module 133, when selecting the closest floor anchor for the wall, disregards floor anchors that violate a constraint requiring cabinets from being within a predefined distance (e.g., five inches) of the floor to be considered resting on the floor. In certain examples, windows and doors are treated as wall anchors during this process of blocks 303 and 305.

At block 307, the method 300 involves adding, by the mesh refinement module 133, the wall to a list of alternate walls. The generated and positioned polygon, associated with a closest ceiling anchor and a closest floor anchor, is added to the list of alternate walls.

At block 309, the method 300 involves determining, by the mesh refinement module 133, whether more wall anchors of the mesh model 116 remain to which blocks 301, 303, 305, and 307 have not been applied.

If further wall anchors in the mesh model 116 to which blocks 301, 303, 305, and 307 have not been applied remain, the method 300 returns to block 301. For example, the mesh refinement module 133 has not created an alternative wall yet for each wall anchor of the mesh model 116.

Returning to block 309, if no further wall anchors in the mesh model 116 to which blocks 301, 303, 305, and 307 have not been applied are remaining, the method 300 proceeds to block 311. For example, the mesh refinement module 133 has already created an alternative wall for each wall anchor of the mesh model 116 and added the alternative wall to the list of walls. Each of the alternative walls in the list of walls is associated with a respective closest ceiling anchor and a closest floor anchor.

In the following blocks 313, 315, 317, and 319, the mesh refinement module 133 identifies wall polygons that overlap and removes duplicate 'straggler' wall polygons.

At block 311, the mesh refinement module 133 determines whether the list of alternate walls includes pairs of intersecting walls. Intersecting walls are walls that overlap with at least one other wall.

If the list of alternate walls includes intersecting walls, the method 300 proceeds to block 313.

At block 313, the mesh refinement module 133 identifies a next intersecting wall. For example, the mesh refinement module 133 performs the following blocks 315, 317, and 319 for each intersecting wall of intersecting walls identified in block 313.

At block 315, the mesh refinement module 133 determines whether the intersecting wall includes a door or window. For example, some of the alternate walls, including some of the intersecting walls, may comprise doors and/or windows.

If the intersecting wall includes a door or a window, the method 300 proceeds to block 317.

At block 317, the mesh refinement module 133 determines whether the intersecting wall, which includes a door or a window, intersects on both sides of the wall.

If the intersecting wall, which includes a door or a window, does not intersect on both sides of the wall, the method 300 proceeds to block 319. For example, the intersecting wall does not overlap, on each of two sides, with at least one other wall.

At block 319, the mesh refinement module 133 removes the intersecting wall from the list of walls. For each pair of intersecting walls, the mesh refinement module 133 removes walls from consideration (e.g., removes the walls from the list of alternate walls) if the wall is really a window or a door and it does not have an intersection on both sides of the wall polygon. In some instances, for each pair of intersecting walls that comprise walls/cabinets, the mesh refinement module 133 determines an angle between the two intersecting wall polygons and, if the angle is less than a predefined amount (e.g., less than 17.5 degrees or another predefined amount), the mesh refinement module 133 removes the smaller of the two intersecting walls from the list of wall polygons.

From block 319, the mesh refinement module 133 returns to block 313. For example, the mesh refinement module 133 identifies a next intersecting wall. In certain embodiments, implementing the method 300 involves implementing blocks 313, 315, 317, and/or 319, as applicable, for each of the intersecting walls determined in block 311 and, upon performing the applicable steps for all the intersecting walls, the method 300 then proceeds to block 321.

Returning to block 315, if an intersecting wall does not include a door or a window, the method 300 returns to block 313. Similarly, returning to block 317, if an intersecting wall, which includes a door or a window, intersects on both sides of the wall, the method 300 returns to block 313. For example, at block 313 the mesh refinement module 133 identifies a next intersecting wall. In certain embodiments, implementing the method 300 involves implementing blocks 313, 315, 317, and/or 319, as applicable, for each of the intersecting walls determined in block 311 and, upon performing the applicable steps for all the intersecting walls, the method 300 then proceeds to block 321.

At block 321, the method 300 involves identifying, by the mesh refinement module 133, intersecting endpoints and T endpoints of the alternate walls. In some instances, the mesh refinement module 133 identifies T intersections between wall polygons and/or intersections of endpoints of wall polygons within a predefined distance (e.g., within eight inches or other predefined distance) of each other.

At block 323, the method 300 involves creating, by the mesh refinement module 133, a list of corners and inserting the corners formed by intersecting endpoints identified in block 321. For example, the mesh refinement module 133 creates a list of wall corners determined at block 321 and inserts wall corners at these areas.

At block 325, the method 300 involves creating, by the mesh refinement module 133, a list of T corners and inserting the T corners formed by T endpoints identified in block 321. Corners placed at T intersections (T corners) are placed in a list of T corners.

At block 327, the method 300 involves setting up, by the mesh refinement module 133, top and bottom corner guides for each corner. For each of the corners in the list of corners, the mesh refinement module 133 sets up wall top corner guides to use for adding points to alternate ceiling anchors and bottom corner guides to use for adding points to floor anchors.

At block 329, the method 300 involves adding, by the mesh refinement module 133, any doors, windows, and/or cabinets intersecting with walls to respective groups and adding the respective groups to the list of walls. In certain embodiments, the mesh refinement module 133 adds doors that do not have intersections with other walls to a group including both doors and walls ("doorwalls"), adds windows that do not have intersections with other walls to a separate group including both windows and walls ("windowwalls"), adds cabinets to a group of alternate cabinets, and adds walls to a group of alternate walls. In certain embodiments, the mesh refinement module 133 creates a separate tag (e.g., a 'gathered' tag) that includes all of the alternate walls (e.g., doorwalls, windowwalls, cabinets, walls) described above.

After completing block 329, the method 300 for implementing block 223 of FIG. 2 ends. In certain embodiments, from block 329, the method 300 proceeds to block 225 of FIG. 2.

FIG. 4 depicts an example of a method 400 for modifying the alternate walls of the mesh model, according to certain embodiments. In certain embodiments, the method 400 is a method for implementing block 227 of FIG. 2. For illustrative purposes, the method 400 is described with reference to the components illustrated in FIG. 1, though other implementations are possible. For example, the program code for one or more of the online services 113 and/or the mesh refinement module 133 of the modeling system 130, which is stored in a non-transitory computer-readable medium, is executed by one or more processing devices to cause the modeling system 130 to perform one or more operations described herein. Although the steps of method 400 are described herein as performed by the mesh refinement module 133, in certain embodiments one or more steps of method 400 are performed by the modeling application 115. For example, the program code for the modeling application 115, which is stored in a non-transitory computer-readable medium, is executed by one or more processing devices to cause the user computing device 110 to perform one or more operations described herein.

At block 401, the method 400 involves identifying, by the mesh refinement module 133, a next wall envelope corner pair closest to ninety (90) degrees. The mesh refinement module 133 repositions the walls in the mesh model 116. For example, for each alternative wall, the mesh refinement module 133 loops through each corner, finds the corner closest to 90 degrees other predefined angle (e.g., 45 degrees, 120 degrees, or other predefined angle).

At block 403, the method 400 involves squaring, by the mesh refinement module 133, the corner identified in block 401 by rotating one wall of the wall envelope pair. In certain examples, squaring comprises moving one of the pair of walls so that the angle between the walls corresponds to the predefined angle (e.g., 90 degrees, 45 degrees, 120 degrees, or another predefined angle) or substantially corresponds to the predefined angle. The mesh refinement module 133 locks the longest of the two walls meeting at the corner. The locked wall is not allowed to move while the non-locked wall is rotated so that the corner is 90 degrees (or other predefined angle) or substantially 90 degrees (or substantially the other predefined angle). Each wall envelope includes (1) a folder that specifies every corner that is attached to each end of the respective wall, and (2) a folder that specifies every T type corner.

At block 405, the method 400 involves determining, by the mesh refinement module 133, if the mesh model 116 comprises another non-square corner. For example, the mesh refinement module 133 performs steps 401, 403, and 405 recursively until all the wall corners of the mesh model 116 are square. The mesh refinement module 133 repositions each corner of the mesh facet in a recursive fashion so that the corners at the ends of each wall are repositioned/rotated until the mesh refinement module 133 has rotated all folders of corners.

If the mesh model 116 comprises another non-square corner, the method 400 returns to block 401. For example, not all the corners of the mesh model 116 have been squared. The mesh refinement module 133 identifies the next non-square corner that is closest to 90 degrees and performs the step of block 403 (e.g., rotating one wall of the pair of walls at the non-square corner) to square the next non-square corner.

Returning to block 405, if the mesh model 116 does not comprise another non-square corner, the method 400 proceeds to block 407. For example, all the corners of the mesh model 116 are squared or have been squared. In some instances, performance of the recursive repositioning procedure results in a squaring up of all wall corners (e.g., if the physical environment 101 is a square room). In these instances, the mesh refinement module 133 calculates a new intersection for the final repositioned wall, because simply repositioning/rotating the final wall would not bring the repositioned wall and the neighboring wall. Accordingly, the new intersection is calculated with respect to the first wall in the loop. In some embodiments, when the recursive repositioning of walls is completed, the mesh refinement module 133 squares up other corners (e.g., cabinets, windows, etc.) if the corners are within a tolerance (e.g., 8 degrees or other predefined tolerance). The recursive repositioning procedure is repeated until all walls have been repositioned/rotated.

In certain embodiments, for each alternate wall envelope identified at block 409, the mesh refinement module 133 straightens, reshapes, smooths, and patches any holes within large mesh facets of the wall envelope at blocks 411 and 413 and reshapes and/or removes small mesh facets and/or sections of small mesh facets of the wall envelope at blocks 417, 419, 421, 423, and 425. The modified mesh model 117 is completed through performance of the example operations described in FIG. 4.

At block 407, the method 400 involves identifying, by mesh refinement module 133, a next wall envelope. For example, a set of wall envelopes for a set of alternate walls was generated at block 223 of FIG. 2.

At block 409, the method 400 involves identifying, by the mesh refinement module 133, a next large mesh facet of the wall envelope. For example, each alternate wall envelope includes a 'large facet' list/folder as described in block 225 of FIG. 2.

At block 411, the method 400 involves straightening, reshaping, and/or smoothing, by the mesh refinement module 133, the large mesh facet identified in block 409. In a further refinement step, the mesh refinement module 133, for each wall, straightens, re-shapes, and/or smooths the mesh facets that are in the 'large facet' folder. In some instances, during the generation of the mesh model 116, a tilting error, determined for each anchor (which is now in the form of a wall envelope) accumulates and, accordingly, mesh facets within the wall envelope are also tilted. To straighten the wall, the mesh refinement module 133 realigns the mesh facets in the 'large facet' folder with the vertical wall. In some instances, realigning the mesh facets comprises finding a proper re-alignment equation matrix. Also, in some instances, the large facet folder includes mesh facets that match the wall's key but do not corresponding to the length, width, or height of the wall. To re-shape the mesh facets in the large facet folder, the mesh refinement module 133 cuts off edges of facets at wall boundaries or moves edges of facets so that the edges align with the wall boundaries. In some instances, operations described above to straighten and/or re-shape mesh facets in the large facet folder introduce small errors to the vertices of the mesh facets. Therefore, the mesh refinement module 133, in these instances, projects each of the vertices of the mesh facets in the large facet folder onto the wall face. The projected vertices are modeled like decals on the wall face.

At block 413, the method 400 involves determining, by the mesh refinement module 133, whether another large mesh facet remains to which blocks 409 and 411 have not been applied.

If one or more large mesh facets to which blocks 409 and 411 have not been applied remain, the method 400 returns to block 409. For example, the mesh refinement module 133 identifies, in block 409, the next large mesh facet of the wall envelope identified in block 407 and performs the operations of block 413 (e.g., straightening, reshaping, and/or smoothing) to the next large mesh facet. For example, the mesh refinement module 133 straightens, reshapes, and/or smooths the next large mesh facet within the next large mesh facet.

Returning to block 413, if no large mesh facets to which blocks 409 and 411 have not been applied remain, the method 400 proceeds to block 415.

At block 415, the method 400 involves patching, by the mesh refinement module 133, holes within the large mesh facet.

The mesh refinement module 133 generates horizontal and vertical wall lines based on existing large facet meshes. For example, to generate the horizontal wall lines, the mesh refinement module 133 sorts the 'large facet' folder into rows from top to bottom and, for each row, sorts the large mesh facets in plan. The mesh refinement module 133 creates (1) a horizontal line from the top vertices of the mesh in each row and (2) a horizontal line from the bottom vertices of the mesh in each row. The horizontal lines are stored in a horizontal line folder within the parent wall envelope. For example, to generate the vertical wall lines, the mesh refinement module 133 sorts the 'large facet' folder into columns in plan and, for each column, sorts the large mesh facets from top to bottom. The mesh refinement module 133 creates (1) a vertical line from the start side of the mesh in each row and (2) a vertical line from the end side of the mesh in each row. For example, the start side is an opposite side from the end side and vice versa (e.g., left and right sides). The vertical lines are stored in a vertical line folder within the parent wall envelope.

The mesh refinement module 133 creates wall blocks (polygons) that are based on the generated vertical lines. For example, for each pair of vertical lines in the vertical line folder (e.g., a start line and an end line), the mesh refinement module 133 creates columns formed of rectangles, which represent the current mesh grid. Using the top and bottom of these columns, the mesh refinement module 133 creates a negative version of these columns starting at the top line of the wall and ending at the bottom line of the wall, which effectively models missing space in column blocks where the large facets have holes. The mesh refinement module 133 links the column blocks in a doubly linked ring, where the links correspond to blocks to the left and right of the current block and for the blocks above and below the current block. For example, each block in the double linked ring can include variables defining blocks to the left, right, top, and bottom of the current block (e.g., lt, nx, up, dn). In some instances, ends of the wall are not covered by the large face mesh. In these instances, the mesh refinement module 133 adds missing columns to the vertical column blocks. Also, in some instances, generating the doubly linked ring results in overlaps in the large face mesh. In these instances, the mesh refinement module 133 finds and removes any columns that overlap the existing mesh.

Reviewing at the linked blocks, the mesh refinement module 133 determines, based on size and placement of the linked blocks, whether a hole being patched by the linked blocks is a 'legitimate hole' or whether the patch is needed. Example legitimate holes include windows and door spaces, which do not need to be patched. The mesh refinement module 133 marks applicable columns associated with windows and doors as legitimate holes. The mesh refinement module 133 cuts the linked blocks, which are shaped as long rectangles, into boxes that are a size of the original large facet mesh using the horizontal lines from the horizontal lines folder and doubly links these boxes both in a horizontal direction and a vertical direction. The mesh refinement module 133 marks the linked boxes with a legitimate hole label or a patch label based on whether the blocks were determined to be a patch or a legitimate hole (door/window). The linked boxes are stored in a boxes folder of the wall envelope.

The mesh refinement module 133 snaps a vertex of each box to a closest vertex of the mesh of the mesh model 116. For example, the mesh refinement module 133 finds the 'large facet' mesh vertices that are closest to the box and snaps the box vertices to the existing mesh, which closes gaps in the wall mesh. Considering both the large facet mesh folder and the boxes folder of the wall envelope, a full grid mesh for the wall exists.

In some instances, logic errors occur when determining where legitimate holes (e.g., doors, windows) are in the mesh. In certain embodiments, to reduce the occurrence of errors, the mesh refinement module 133 reviews the list of small mesh facets (e.g., doors, windows) and determine which boxes of the linked boxes are located within the borders of the small mesh facets. These identified linked boxes located within the small mesh facet borders represent legitimate holes. The mesh refinement module adds the wall patches (e.g., linked boxes not corresponding to legitimate holes) to the large facet mesh list.

At block 417, the method 400 involves the mesh refinement module 133 generating horizontal reference lines and horizontal row boxes for the large mesh facet. The mesh refinement module 133 creates a set of horizontal lines that follow top edges and bottom edges of the grid of large mesh facets associated with the wall. The mesh refinement module 133 uses the horizontal references lines to create horizontal row boxes, minus boxes associated with legitimate holes, that define a final shape of the wall. The mesh refinement module 133 saves these generated horizontal row boxes.

At block 419, the method 400 involves identifying, by the mesh refinement module 133, a next small mesh facet within the wall envelope. For example, the wall envelope includes a folder including one or more small mesh facets (e.g., representing doors, windows, cabinets, or other objects).

At block 421, the method 400 involves reshaping, by the mesh refinement module 133, the small mesh facet identified in block 419. Using a method like the method performed in block 411 for reshaping large mesh facets, the mesh refinement module 133 reshapes the next small mesh facet so that none of it extends beyond a top/bottom/sides of the wall face. In some instances, the mesh refinement module 133 moves vertices to edges of the parent wall or crops vertices of the small mesh facet.

At block 423, the method 400 involves removing, by the mesh refinement module 133, the small mesh facet if the small mesh facet is within the horizontal row boxes generated in block 417. Removing the small mesh facet in some instances minimizes overlaps between small mesh facets and large mesh facets in the modified mesh model 117.

At block 425, the method 400 involves removing, by the mesh refinement module 133 if the small facet is at an intersection of a large facet and a legitimate hole, an overlap of the small and large facets. Removing the overlap can include using the legitimate holes determined in previous steps to find small facets that are located at an intersection of a large facet and a legitimate hole box (of the linked boxes generated previously), so that an overlap of small mesh facets and large mesh facets is removed.

At block 427, the method 400 involves determining, by the mesh refinement module 133, if another small mesh facet, associated with the wall envelope and to which blocks 421, 423, and 425 have not been applied, remains.

If the mesh refinement module 133 determines that at least another small mesh facet to which blocks 421, 423, and 425 have not been applied and associated with the wall envelope remains, the method 400 returns to block 419. For example, each of the blocks 421, 423, and 425 is performed for each of the small mesh facets in the wall envelope.

Returning to block 427, if the mesh refinement module 133 determines no more mesh facets to which blocks 421, 423, and 425 have not been applied and associated with the wall envelope remain, the method 400 proceeds to block 429.

At block 429, the method 400 involves determining, by the mesh refinement module 133, if another wall envelope, for which blocks 409, 411, 413, 415, 417, 419, 421, 423, and 425 (as applicable) has not been applied, remains.

If another wall envelope for which blocks 409, 411, 413, 415, 417, 419, 421, 423, and 425 (as applicable) has not been applied remains, the method 400 returns to block 407. For example, at block 407.

Returning to block 429, if another wall blocks 409, 411, 413, 415, 417, 419, 421, 423, and 425 (as applicable) has not been applied does not remain, the method 400 ends. In some embodiments, instead of ending, the method 400 returns to block 227 of FIG. 2 after completion of block 429. For example, in some embodiments, the method 400 is a method for implementing block 227 of FIG. 2.

FIG. 5 illustrates an example mesh model 500 (e.g., a mesh model 116). FIG. 5 depicts, in part, a triangulated mesh of the mesh model. For example, FIG. 5 shows the triangulated mesh on a floor and a ceiling region of the mesh model 500. As shown in FIG. 5, particular imperfections often occur in a mesh model 116, such as the uneven/overlapping wall regions 501 as well as the doubled-up ceiling region 502.

FIG. 6 depicts an example illustration of a 3D model 600 generated from the mesh model 500 of FIG. 5, modified in accordance with one or more of the methods described in FIGS. 2-4, in accordance with certain embodiments. As compared with the mesh model 500 of FIG. 5, the 3D model 600 generated in FIG. 6 has smooth walls, floors, and ceilings (e.g., the walls are rectified orthogonal planes), the result being that the 3D model 600, which is generated from the modified mesh model comprising one or more corrections made to the mesh model 500 of FIG. 5.

Example of a Computing System for Implementing Certain Embodiments

Figure 7:
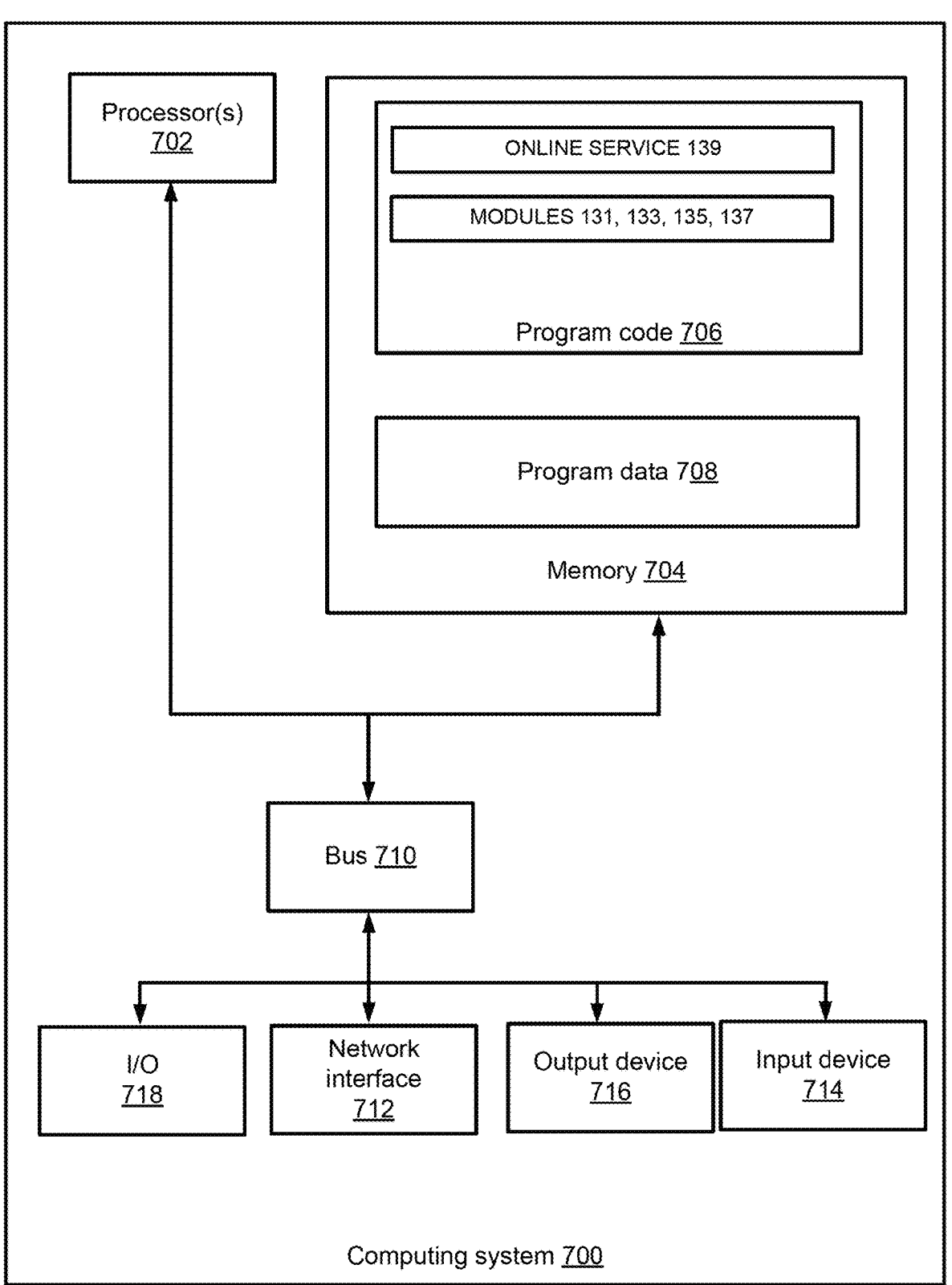
FIG. 7 depicts an example of a computing system that may perform certain operations described herein, according to certain embodiments described in the present disclosure.

Any suitable computing system or group of computing systems can be used for performing the operations described herein. For example, FIG. 7 depicts an example of a computing system 700. The computing system 700 can include the modeling system 130.

The depicted examples of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions.

The computing system 700 executes program code 706 that configures the processor 402 to perform one or more of the operations described herein. The program code 706 includes, for example, the online service 139, the modules 131, 133, 135, and/or 137, or other suitable applications (e.g., modeling application 115) that perform one or more operations described herein. The program code 706 may be resident in the memory device 704 or any suitable computer-readable medium and may be executed by the processor 702 or any other suitable processor. The program code could include processor-specific instructions generated by a compiler or an interpreter from code written in any suitable computer-programming language, including, for example, Swift, Objective-C, C, C++, C#, Visual Basic, Java, Python, Perl, JavaScript, and ActionScript.

In some embodiments, program code 706 for implementing both the online service 139 and the modules 131, 133, 135, and/or 137 are stored in the memory device 704, as depicted in FIG. 7. In additional or alternative embodiments, program code 706 for implementing one or more of the online services 139 and the modules 131, 133, 135, and/or 137 are stored in different memory devices of different computing systems. In additional or alternative embodiments, the program code 706 described above is stored in one or more other memory devices accessible via a data network.

The computing system 700 can access program data 707, which includes one or more of the datasets described herein (e.g., scan 102 data of the LiDAR component 113, a mesh model 116, a modified mesh model 117, a 3D model 118), in any suitable manner. In some embodiments, some or all of one or more of these data sets, models, and functions are stored as the program data 707 in the memory device 704, as in the example depicted in FIG. 7. In additional or alternative embodiments, one or more of these data sets, models, and functions are stored in the same memory device (e.g., one of the memory devices 704). For example, a common computing system, such as the modeling system 130 depicted in FIG. 1, can include hardware, software, or both that implements the online service 139 and the modules 131, 133, 135, and/or 137. In additional or alternative embodiments, one or more of the programs, data sets, models, and functions described herein are stored in one or more other memory devices accessible via a data network.

The computing system 700 also includes a network interface device 712. The network interface device 712 includes any device or group of devices suitable for establishing a wired or wireless data connection to one or more data networks. Non-limiting examples of the network interface device 712 include an Ethernet network adapter, a modem, and the like. The computing system 700 can communicate with one or more other computing devices (e.g., computing device associated with user computing devices 110) via a data network using the network interface device 710.

The computing system 700 may also include a number of external or internal devices, such as input or output devices. For example, the computing system 700 is shown with one or more input/output ("I/O") interfaces 718. An I/O interface 718 can receive input from input devices or provide output to output devices. One or more buses 710 are also included in the computing system 700. The bus 710 communicatively couples one or more components of a respective one of the computing system 700.

In some embodiments, the computing system 700 also includes the input device 714 and the presentation device 716 depicted in FIG. 7. An input device 714 can include any device or group of devices suitable for receiving visual, auditory, or other suitable input that controls or affects the operations of the processor 702. Non-limiting examples of the input device 714 include a touchscreen, a mouse, a keyboard, a microphone, a separate mobile computing device, etc. A presentation device 716 can include any device or group of devices suitable for providing visual, auditory, or other suitable sensory output. Non-limiting examples of the presentation device 716 include a touch-screen, a monitor, a speaker, a separate mobile computing device, etc.

Although FIG. 7 depicts the input device 714 and the presentation device 716 as being local to the computing device that executes the program code 706, other implementations are possible. For instance, in some embodiments, one or more of the input devices 714 and the presentation device 716 can include a remote client-computing device that communicates with the computing system 700 via the network interface device 712 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method, comprising:

using a user computing device:

accessing a mesh model generated via a light detection and ranging (LiDAR) scan of an environment comprising a room, the mesh model including anchors assigned during the LiDAR scan, the anchors comprising vertical plane anchor types assigned as wall anchors corresponding to walls of the room and horizontal plane anchor types assigned as either floor anchors corresponding to a floor of the room or ceiling anchors corresponding to a ceiling of the room;

establishing, based on positions of the floor anchors in the mesh model, a floor reference height, wherein establishing the floor reference height comprises identifying extents of the floor anchors, determining a center vertical height as a base reference, and determining, for each of the anchors assigned as the floor anchors in the mesh model, a floor height adjusted to the base reference;

establishing, based on positions of the ceiling anchors in the mesh model, a ceiling reference height, wherein establishing the ceiling reference height comprises determining, for each of the anchors assigned as the ceiling anchors in the mesh model, a height adjusted to the base reference;

generating, based on the wall anchors in the mesh model, polygons corresponding to alternate walls, the polygons having dimensions associated with the wall anchors, the alternate walls corresponding to mesh facets of the mesh model;

generating, for each of the alternate walls, a key associating one of the mesh facets with a corresponding one of the alternate walls;

repositioning one or more of the alternate walls based at least in part on at least one of the floor reference height or the ceiling reference height;

modifying a configuration of the mesh facets based on a configuration of the alternate walls to generate a modified mesh model, wherein modifying the configuration comprises, for each mesh facet, matching the mesh facet to the corresponding alternate wall using the key, and modifying the configuration of the mesh facet based on the configuration of the corresponding alternate wall; and rendering a three-dimensional (3D) model of the environment from the modified mesh model.

2. The computer-implemented method of claim 1, further comprising:

performing, by the user computing device, the LiDAR scan of the environment of the user computing device; and based on data of the scan, constructing, by the user computing device, the mesh model.

3. The computer-implemented method of claim 1, wherein generating the alternate walls comprises:

for each of the wall anchors in the mesh model:

repositioning one or more of the alternate walls based on the floor and ceiling reference heights.

4. The computer-implemented method of claim 1, further comprising:

identifying a corner in the mesh model formed by a pair of adjacent alternate walls, wherein the corner is an angle that does not correspond to a predefined angle; and modifying the angle of the corner by moving one of the pair of adjacent alternate walls so that the angle of the corner corresponds to the predefined angle, wherein the modified mesh model includes the pair of adjacent alternate walls with the corner at the predefined angle.

5. The computer-implemented method of claim 4, wherein the predefined angle comprises a substantially ninety (90) degree angle.

6. The computer-implemented method of claim 1, wherein modifying the configuration of the mesh facets comprises:

determining, for an alternate wall of the mesh model, a misalignment between a mesh facet associated with the alternate wall and the alternate wall, the misalignment comprising a tilting error; and aligning the mesh facet with the alternate wall by at least applying a realignment equation matrix to correct the tilting error.

7. The computer-implemented method of claim 1, wherein modifying the configuration of the mesh facets comprises:

determining, for an alternate wall of the mesh model, a mesh facet including regions outside of boundaries of the alternate wall; and cropping the mesh facet to remove the regions outside of the boundaries of the alternate wall.

8. The computer-implemented method of claim 1, wherein modifying the configuration of the mesh facets comprises:

determining, for an alternate wall of the mesh model, a mesh facet including regions outside of boundaries of the alternate wall; and modifying a position of the mesh facet so that the regions are within the boundaries of the alternate wall.

9. The computer-implemented method of claim 1, wherein modifying the configuration of the mesh facets comprises:

determining for an alternate wall of the mesh model, that the mesh facet includes a missing region of mesh; and filling the missing region of mesh to generate a modified mesh facet, wherein the modified mesh model includes the modified mesh facet.

10. A non-transitory computer-readable storage medium comprising computer-executable instructions that when executed by a processor cause the processor to perform operations comprising:

accessing a mesh model generated via a light detection and ranging (LiDAR) scan of an environment comprising a room, the mesh model including anchors assigned during the LiDAR scan, the anchors comprising vertical plane anchor types assigned as wall anchors corresponding to walls of the room and horizontal plane anchor types assigned as either floor anchors corresponding to a floor of the room or ceiling anchors corresponding to a ceiling of the room;

establishing, based on positions of the floor anchors in the mesh model, a floor reference height, wherein establishing the floor reference height comprises identifying extents of the floor anchors, determining a center vertical height as a base reference, and determining, for each of the anchors assigned as the floor anchors in the mesh model, a floor height adjusted to the base reference;

establishing, based on positions of the ceiling anchors in the mesh model, a ceiling reference height, wherein establishing the ceiling reference height comprises determining, for each of the anchors assigned as the ceiling anchors in the mesh model, a height adjusted to the base reference;

generating, based on the wall anchors in the mesh model, polygons corresponding to alternate walls, the polygons having dimensions associated with the wall anchors, the alternate walls corresponding to mesh facets of the mesh model;

generating, for each of the alternate walls, a key associating one of the mesh facets with a corresponding one of the alternate walls;

repositioning one or more of the alternate walls based at least in part on the floor reference height or the ceiling reference height;

modifying a configuration of the mesh facets based on a configuration of the alternate walls to generate a modified mesh model, wherein modifying the configuration comprises, for each mesh facet, matching the mesh facet to the corresponding alternate wall using the key, and modifying the configuration of the mesh facet based on the configuration of the corresponding alternate wall; and rendering a three-dimensional (3D) model of the environment from the modified mesh model.

11. The non-transitory computer-readable storage medium of claim 10, the operations further comprising:

performing the LiDAR scan of the environment of a user computing device; and based on data of the scan, constructing the mesh model.

12. The non-transitory computer-readable storage medium of claim 10, wherein generating the alternate walls comprises:

for each of the wall anchors in the mesh model:

repositioning one or more of the alternate walls based on the floor and ceiling reference heights.

13. The non-transitory computer-readable storage medium of claim 10, the operations further comprising:

identifying a corner in the mesh model formed by a pair of adjacent alternate walls, wherein the corner is an angle that does not correspond to a predefined angle; and modifying the angle of the corner by moving one of the pair of adjacent alternate walls so that the angle of the corner corresponds to the predefined angle, wherein the modified mesh model includes the pair of adjacent alternate walls with the corner at the predefined angle.

14. A system, comprising:

one or more processors; and a non-transitory computer-readable storage medium comprising computer-executable instructions that, when executed by the processor, cause the system to:

access a mesh model generated via a light detection and ranging (LiDAR) scan of an environment comprising a room, the mesh model including anchors assigned during the LiDAR scan, the anchors comprising vertical plane anchor types assigned as wall anchors corresponding to walls of the room and horizontal plane anchor types assigned as either floor anchors corresponding to a floor of the room or ceiling anchors corresponding to a ceiling of the room;

establish, based on positions of the floor anchors in the mesh model, a floor reference height, wherein establishing the floor reference height comprises identifying extents of the floor anchors, determining a center vertical height as a base reference, and determining, for each of the anchors assigned as the floor anchors in the mesh model, a floor height adjusted to the base reference;

establish, based on positions of the ceiling anchors in the mesh model, a ceiling reference height, wherein establishing the ceiling reference height comprises determining, for each of the anchors assigned as the ceiling anchors in the mesh model, a height adjusted to the base reference;

generate, based on the wall anchors in the mesh model, polygons corresponding to alternate walls, the polygons having dimensions associated with the wall anchors, the alternate walls corresponding to mesh facets of the mesh model;

generating, for each of the alternate walls, a key associating one of the mesh facets with a corresponding one of the alternate walls;

repositioning one or more of the alternate walls based at least in part on at least one of the floor reference height or the ceiling reference height;

modify a configuration of the mesh facets based on a configuration of the alternate walls to generate a modified mesh model, wherein modifying the configuration comprises, for each mesh facet, matching the mesh facet to the corresponding alternate wall using the key, and modifying the configuration of the mesh facet based on the configuration of the corresponding alternate wall; and render a three-dimensional (3D) model of the environment from the modified mesh model.

15. The system of claim 14, the non-transitory computer-readable storage medium further comprising computer-executable instructions that, when executed by the processor, cause the system to:

performing the LiDAR scan of the environment of a user computing device; and based on data of the scan, constructing the mesh model.

16. The system of claim 14, wherein generating the alternate walls comprises:

for each of the wall anchors in the mesh model:

repositioning one or more of the alternate walls based on the floor and ceiling reference heights.

17. The system of claim 14, the non-transitory computer-readable storage medium further comprising computer-executable instructions that, when executed by the processor, cause the system to:

identify a corner in the mesh model formed by a pair of adjacent alternate walls, wherein the corner is an angle that does not correspond to a predefined angle; and modify the angle of the corner by moving one of the pair of adjacent alternate walls so that the angle of the corner corresponds to the predefined angle, wherein the modified mesh model includes the pair of adjacent alternate walls with the corner at the predefined angle.

18. The system of claim 14, wherein modifying the configuration of the mesh facets comprises:

determining, for an alternate wall of the mesh model, a misalignment between a mesh facet associated with the alternate wall and the alternate wall, the misalignment comprising a tilting error; and aligning the mesh facet with the alternate wall by at least applying a realignment equation matrix to correct the tilting error.

19. The system of claim 14, wherein modifying the configuration of the mesh facets comprises:

determining, for an alternate wall of the mesh model, a mesh facet including regions outside of boundaries of the alternate wall; and cropping the mesh facet to remove the regions outside of the boundaries of the alternate wall.

20. The system of claim 14, wherein modifying the configuration of the mesh facets comprises:

determining, for an alternate wall of the mesh model, a mesh facet including regions outside of boundaries of the alternate wall; and modifying a position of the mesh facet to so that the regions are within the boundaries of the alternate wall.

\* \* \* \* \*